(12) United States Patent
Stephanou

(10) Patent No.: US 6,513,013 B1
(45) Date of Patent: *Jan. 28, 2003

(54) SYSTEM AND METHOD FOR PROVIDING EXPERT REFERRAL OVER A NETWORK WITH REAL TIME INTERACTION WITH CUSTOMERS

(76) Inventor: Dimitri Stephanou, 19204 Aria Ct., Brookeville, MD (US) 20833

( * ) Notice: Subject to any disclaimer, the term of this patent is extended or adjusted under 35 U.S.C. 154(b) by 0 days.

This patent is subject to a terminal disclaimer.

(21) Appl. No.: 09/550,656

(22) Filed: Apr. 17, 2000

Related U.S. Application Data
(60) Provisional application No. 60/167,065, filed on Nov. 23, 1999.

(51) Int. Cl.[7] ............................................. G06F 17/60
(52) U.S. Cl. ................................. 705/9; 705/1; 705/26
(58) Field of Search .................... 705/7, 9, 10; 700/49; 706/45, 50, 61; 434/350; 379/265.01–265.14

(56) References Cited

U.S. PATENT DOCUMENTS

| 5,862,223 | A | * | 1/1999 | Walker et al. ................. 705/50 |
| 6,026,148 | A | * | 2/2000 | Dworkin et al. ............... 379/88 |
| 6,223,165 | B1 | * | 4/2001 | Lauffer .......................... 705/8 |
| 6,230,287 | B1 | * | 5/2001 | Pinard et al. ................. 714/41 |
| 6,333,980 | B1 | * | 12/2001 | Hollatz et al. ............... 379/265 |

FOREIGN PATENT DOCUMENTS

DE    19812167 A1  * 12/1999  ........... H04L/12/02

OTHER PUBLICATIONS

Keen. Keen.com Launches First Live Answer Community. Keen.com [online], Nov. 8, 1999 [retrieved on Oct. 24, 2000]. Retrieved from the Internet:<URL: http://www.keen.com/documents/corpinfo/press11899.asp>, pp: (2).*

EXP. EXP press releases on expert advice services at exp.com. EXP.com [online], Jul., 1999 [retrieved on Oct. 24, 2000]. Retrieved from the Internet:<URL: http://www.exp.com/app/display?page=corp_about_us_press_center>, pp: (4).*

* cited by examiner

*Primary Examiner*—Tariq R. Hafiz
*Assistant Examiner*—D. Robertson
(74) *Attorney, Agent, or Firm*—Roberts Abokhair & Mardula, LLC

(57) ABSTRACT

A system and method for assigning an expert to a request for assistance including real time interaction. The invention allows users to request assistance over the internet to an expert server having a file of qualified experts. The trouble "ticket" is assigned and alias and is sent out to a number of experts having the correct qualifications who then have an opportunity to respond. The first to respond is assigned an alias and communicates in real time with the requester via the expert server. Upon completion of the ticket, the expert so designates and the requester is asked to fill out a survey noting the satisfaction with the service provided. Experts are assigned rankings and are paid and solicited for further work based upon the ranking. The system of the present invention is used in a variety of disciplines.

26 Claims, 21 Drawing Sheets

TOOL BAR

| | |
|---|---|
| FIRST NAME | John |
| LAST NAME | Smith |
| PASSWORD | ******** |
| CONFIRM PASSWORD | ******** |
| COMPANY | |
| E-MAIL | jsmith@aol.com |
| ADDRESS 1 | 123 Main St. |
| ADDRESS 2 | |
| CITY | AnyTown |
| STATE | AnyState |
| ZIP | 12345 |
| COUNTRY | USA |

} 204

[SUBMIT INFO]   [CLEAR FORM]

Fig. 6

TOOL BAR

USER HOME
CHANGE PROFILE
CHANGE PASSWD
TICKET HISTORY
VIEW/CREATE TICKET
LOGOUT

NAME  FADI EIDI
CITY  OLNEY
E-MAIL  FADI@EXPION.COM

NEW TICKET? ▼ — 210
CATEGORY ▼ — 212
PREFERRED METHOD ▼

PROBLEM DESCRIPTION
▼
▲ — 214

ENTER TICKET    RESET

TOOL BAR

| | |
|---|---|
| I AM AN EXPERT! | |
| | FIRST NAME: Fadi |
| | LAST NAME: Eidi |
| WHO CAN JOIN? | PASSWORD: ******** |
| FAQ | CONFIRM PASSWORD: ******** |
| HOW IT WORKS | BY E-MAIL: fadie@expion.com |
| TICKET HISTORY | BY PHONE: |
| SIGN UP | BY FAX: |
| MY PROFILE | BY MAIL: |
| | CITY: Bethesda |
| | STATE/PROVINCE: MD |
| | POSTAL CODE: 20817 |
| | COUNTRY: USA |

234

236 — NEXT    RESET
SAVE AND EXIT

Fig. 15

TOOL BAR

I AM AN EXPERT!

WHO CAN JOIN?
FAQ
HOW IT WORKS
TICKET HISTORY
SIGN UP
MY PROFILE

SKILLS

| YEARS | TYPE |
|---|---|
| 2 | CISCO |
| YEARS | TYPE |
| 5 | EXCHANGE |
| YEARS | TYPE |
| 6 | WINDOWS NT |

⎫
⎬ 238
⎭

236 — NEXT  RESET

SAVE AND EXIT

Fig. 16

TOOL BAR

I AM AN EXPERT!

WHO CAN JOIN?
FAQ
HOW IT WORKS
TICKET HISTORY
SIGN UP
MY PROFILE

FIRST NAME  STEWART
LAST NAME   SMITH
TITLE
COMPANY
E-MAIL
PHONE

DESCRIPTION

242

NEXT   RESET   SAVE AND EXIT
ANOTHER REFERENCE

Fig. 18

SYSTEM AND METHOD FOR PROVIDING EXPERT REFERRAL OVER A NETWORK WITH REAL TIME INTERACTION WITH CUSTOMERS

RELATIONSHIP TO OTHER APPLICATIONS

This application is a utility application which claims the benefit and priority of Provisional Application No. 60/167,065 entitled "System and Method for Providing Expert Help Over a Network" filed Nov. 23, 1999.

FIELD OF THE INVENTION

This invention relates generally to network access to for expert referral. More particularly the present invention provides a system and method for obtaining assistance via network notification to experts and subsequent expert-to-customer contact.

BACKGROUND OF THE INVENTION

As computers and software proliferate, the need for help desk assistance becomes more and more critical especially to those customers who are not technically sophisticated. The difficulty is that individual customers become frustrated when they must sit on a help line for many hours before they get human assistance or, equally frustrating, are shunted to a frequently asked question screen, which has the answers to many questions that are not helpful for the particular problem that the individual customer is experiencing.

The present invention seeks to solve these problems by qualifying and establishing a large number of experts in various hardware and software fields. For example, the present invention will solicit and store qualifications for experts in Microsoft Windows, Sun products, Apple products, and indeed, many other hardware and software products. These experts, most of whom will be independent contractors, will be directly accessible via the database of the present invention.

After registration with the system of the present invention and providing customer contact information such as telephone number and email, when a customer needs particular assistance with a particular product, the customer will access the website of the present invention and state the problem being experienced. Once a query for help is made, the system of the present invention sends a pager or other notification signal to an appropriate expert who can handle the problem being experienced by the customer. Indeed, a call may go out to multiple experts all of whom have the option to respond to the particular request. Contact information is also presented to the experts in this first communication.

Whichever expert responds first to the request, that expert will have the contact information to immediately contact the customer experiencing the problem. In this fashion, one of the key problem areas, that is time of responding to a problem, is minimized.

The expert can then respond either via email through the server of the present invention to the customer or via internet telephone through the server of the present invention to the customer. In either case response goes through the server of the present invention in order to be able to track such statistics as response time, and whether the customer was satisfied or dissatisfied with the response of the particular expert.

In responding to the customer, several modes of communication can take place. As noted above, email between the customer and the expert can occur. However, in those cases where a more consistent contact is required during troubleshooting, the system provides for a real time "chat" session to take place whereby an ongoing conversation via a typical chat window is established. In the event that even more contact is required, a video conferencing link may also be established by the server of the present invention to allow troubleshooting to occur in a more visual fashion. Yet another route which may be established is internet telephony between expert and customer. All of these methods are within the scope of the present invention and are designed to solve the problem being encountered by the customer quickly and efficiently Once the problem is solved, the customer who experienced the problem is given the option of responding to a questionnaire simply asking if the problem was solved, if the expert was responsive to the question, and several other key questions that will assist the system of the present invention in evaluating the performance of the expert.

Statistics will be kept on the performance of experts involved in the system. For those experts who continually rank highly, calls for assistance will continue to go to those experts on a priority basis. For those experts who are not as successful, they will fall lower in the priority list and will not receive as many calls for assistance from the system.

The present invention is is adaptive. If an expert who is lower on the priority list continues to get high grades from customers for accomplishing tasks, that expert can climb in the rankings and achieve a priority ranking thereby receiving more request for assistance and hence, more revenue from responding to customers needs. Conversely, those experts who do not receive favorable rankings from customers will fall in the overall rankings of experts and will not receive as many phone calls for assistance an hence, will not receive as much revenue from the present invention.

All transactions, in the preferred embodiment occur via the internet, although this not meant as a limitation, whether they be by email, or internet telephone. It will be apparent to those skilled in the art that communication between customer and expert can also occur via telephone as well. And all transactions will proceed through the server of the present invention so that activities of experts and statistics on types and frequencies of certain troubled calls can be monitored.

In summary what is created is a virtual help desk, having experts in many different areas of expertise immediately and competently responding to the queries for help from customers who are in need.

BRIEF DESCRIPTION OF THE FIGURES

FIG. 6 illustrates a screen consisting of a data entry sheet requesting a plurality of answers pertaining to customer identification.

FIG. 9 illustrates a plurality of questions pertaining to the customer's problem.

FIG. 15 illustrates a plurality of requests for items of information regarding contact information for the expert(s).

FIG. 16 illustrates a plurality of pull down menus regarding the expert's skills.

FIG. 18 illustrates a plurality of items of information regarding references for experts.

DETAILED DESCRIPTION OF THE INVENTION

Figure 1:
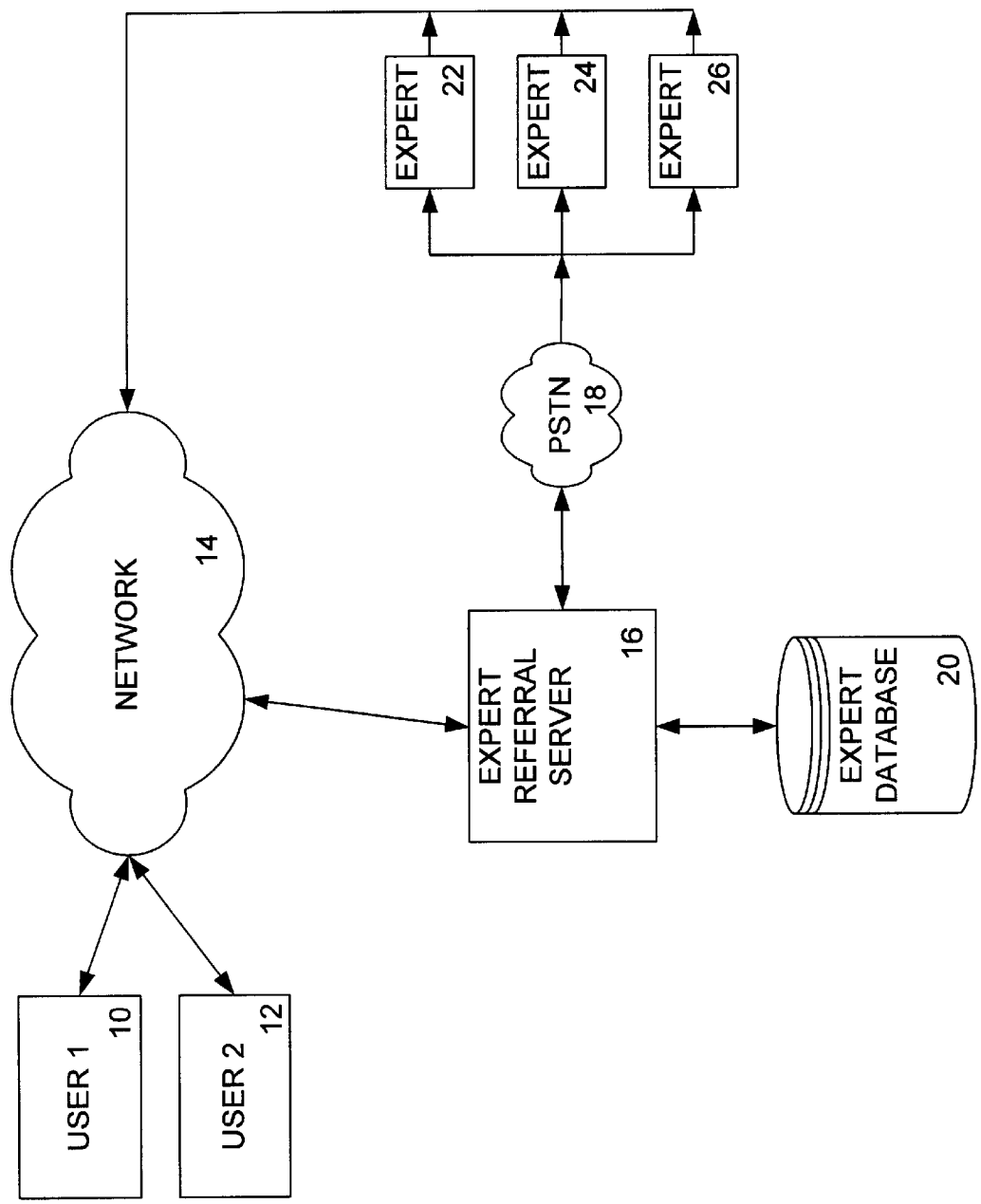
FIG. 1 illustrates the architecture of the present invention.

Referring to FIG. 1, the overall architecture of the present invention is illustrated. A plurality of customers, indeed anyone connected to the internet 9 or a network contemplated as one to be used with the present invention, her illustrated simply as two customers, customers 10 and 12, who are connected to the internet, may experience some form of computer-related or other type of problem. Customers 10, 12 contact the Expert Reference Server (ER Server) 16 via a network, preferably the internet 14 although this is not meant as a limitation. For example other networks in addition to the internet can also be used. Customers 10, 12 pose the particular question or problem being encountered with their system to the ER Server 16 over the network 14.

Depending upon the type of problem cited, ER Server 16 reviews its database of experts 20 for the individual or individuals who are capable of responding to the questions from customers 10, 12. This database of experts not only has qualifications of the experts but also maintains a database of their availability if, for example, an expert is on vacation for a period of time or is unavailable during a period of the day. Upon determining the appropriate individual(s) who can respond to the problem, ER Server 16 sends a message via any means known in the art such as wired or wireless as in the case of beepers and cell phones, in this case illustrated as over the public switch telephone network (PSTN) 18 to the beepers of experts 22, 24, 26 with a general reference to the type of problem being encountered. This notification via PSTN is for illustrative purposes only. It is anticipated that the experts can also be notified via the internet and the various means, such as internet paging and telephone for example, available via the internet.

Experts 22, 24, 26 are beeped and, preferably an alphanumeric display noting the problem being posed by customers 10, 12 is displayed. At that point any one of the experts 22, 24, 26 can respond to ER Server 16 that he will handle the problem being posed.

Contact from experts 22, 24, and 26 can occur via the public switch telephone network 18 or via the network 14 to the ER Server 16.

Thereafter, and assuming, for example expert 22 responded first to the query, ER Server 16 allows contact between expert 22 and, for example customer 12 in the following fashion:

Internet telephone service can be used whereby expert 22 is connected to customer 12 through server 16. In this fashion, ER Server 16 can monitor the length of the call and broker the connection between expert 22 and customer 12. Alternatively, the telephone number of customer 12 can be provided to expert 22. Thereafter, expert 22 can contact customer 12 to solve the problem by voice communication. Where facilities exist, a videoconferencing session can be arranged. In addition, the ER server 16 has the capability to establish a real time "chat" session between the customer and the expert. Finally, ER Server 16 can provide the email address of customer 12 to expert 22 thereby allowing email response to the problem being posed and also allowing back and forth communication over network 14. Any of these methods are deemed to be within the scope of the present invention and facilitate solving the customer's problem in an effective and efficient manner.

After the completion of the service call by the means discussed above, expert 22 provides notification to ER Server 16 that the call has been successfully completed. Expert Server 16 logs the completion time and date of the trouble call that was requested by the customer. In this way, statistics on the general length of time to respond to and solve customer problems can be logged. Further, information on the individual expert can also be kept in the following fashion:

ER Server 16 not only brokers a trouble call between customers 10, 12 and experts 22, 24, and 26, but also keeps track of how well the individual experts perform in their assigned tasks. For example, at the completion of each trouble call, and after the expert has provided notification to the ER Server that the call has been completed, the ER Server provides a questionnaire to the customers 10, 12 seeking input on customer satisfaction with the service being offered. At that point, customers 10, 12 have the opportunity to respond to ER Server 16 regarding whether the experts 22, 24, or 26 solved the problem successfully and in a timely fashion.

ER Server 16 collects statistics on the performance of experts 22, 24, and 26, thereby monitoring the performance of these experts. If any of the experts continually score poorly in the estimation of customers 10, 12, the ranking of that particular expert will be established as lower than that of the experts who perform successfully on various assigned tasks. This has several ramifications. If a particular expert does not perform well, that expert is put low on the priority list for being contacted by ER Server 16. If the expert continues to perform poorly on the tasks that are assigned, eventually the expert will be eliminated from the roll of experts who can respond to service calls. Conversely, if an individual expert who initially performed poorly begins to perform better on service calls assigned to that expert, ER Server 16 will keep track of that improvement thereby raising the priority of that expert and list of experts who will be called to respond to service calls. In this fashion, expert database 20 is continually updated and quality control on the experts who are contacted and assigned customer tasks can therefore be maintained.

In this fashion, a series of problems are solved by the system and method of the present invention. First, individual customers 10, 12 no longer have to wait inordinate amounts of time for response to trouble calls on their computer systems.

ER Server 16 establishes the mutual arrangement between customers 10 and 12 before any service call is made to experts 22, 24, and 26. In this fashion, experts 22, 24, and 26 do not have to be concerned about how to invoice and collect fees from customers 10, 12.

Customers 10, 12 benefit from having the best experts who can solve technical problems since the ER Server 16 continually updates and establishes quality control via its expert database 20 over the experts who are called to respond to trouble calls in the first place.

On a periodic basis, ER Server 16 and the business entity that surrounds that server, remits to experts 22, 24, and 26 their fees for the service calls responded to on a monthly or quarterly basis as desired.

Figure 2A:
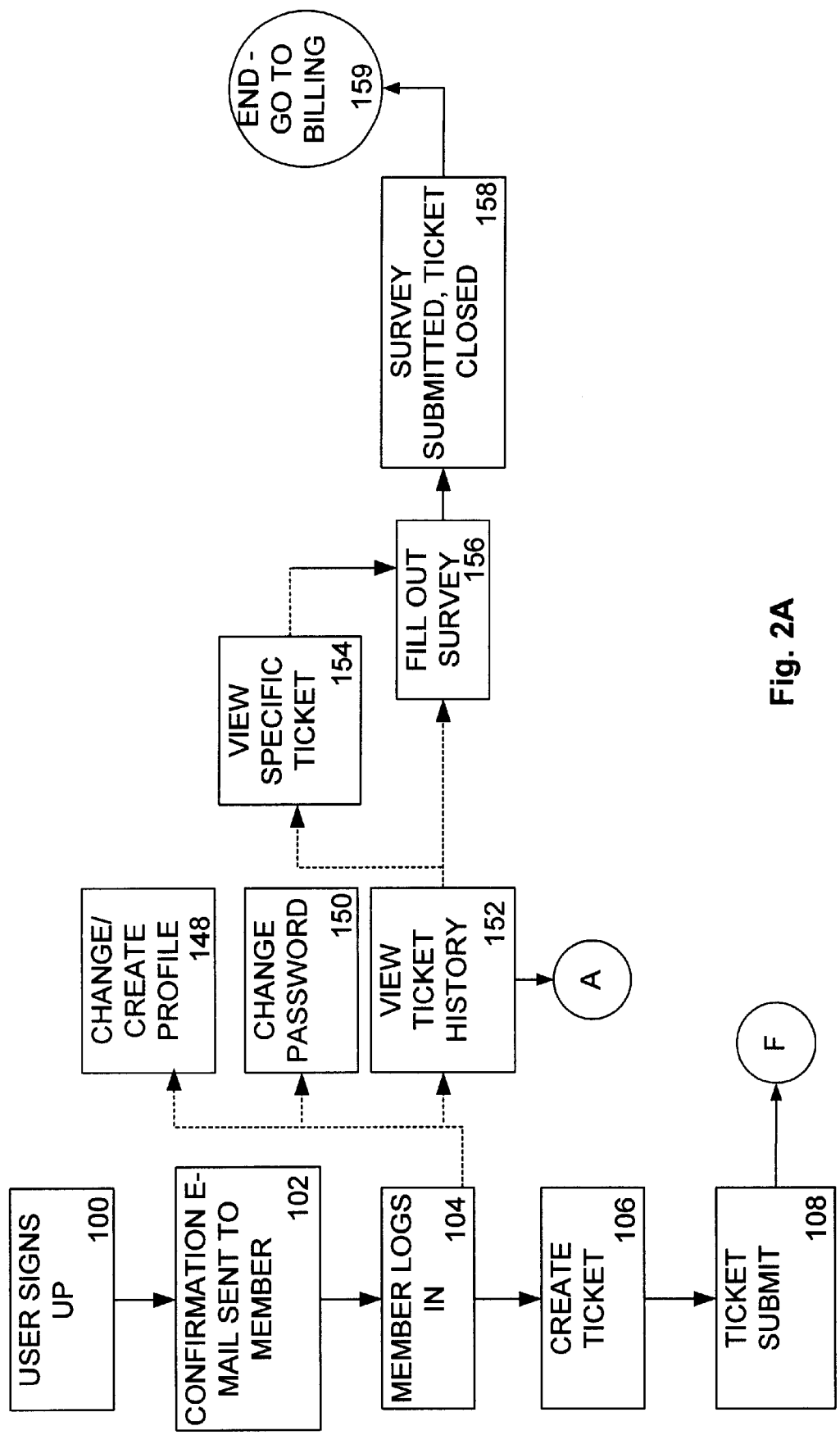
FIG. 2 illustrates the overall assign up, assignment, and expert response flow of the present invention.
Figure 2B:
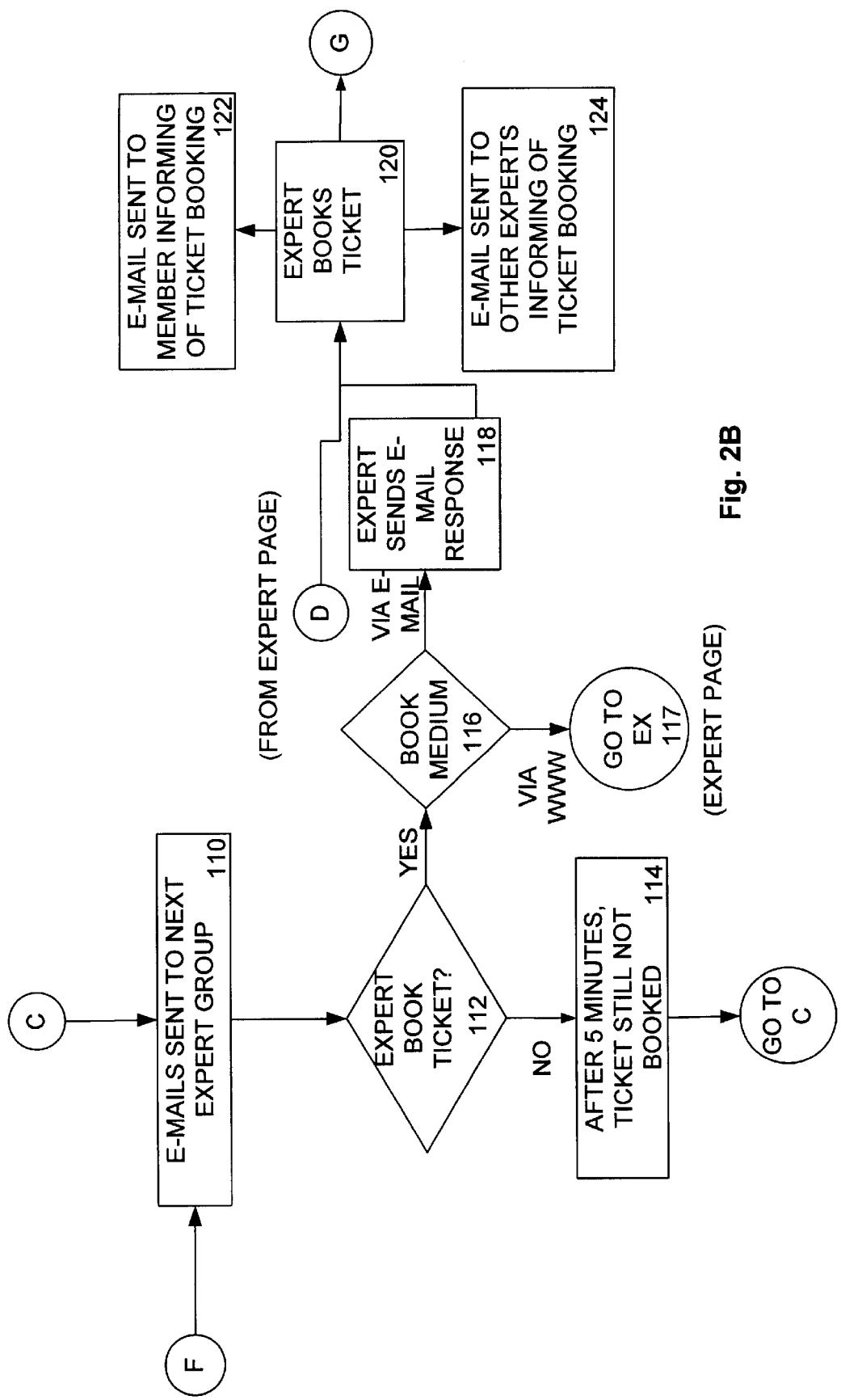
Figure 2C:
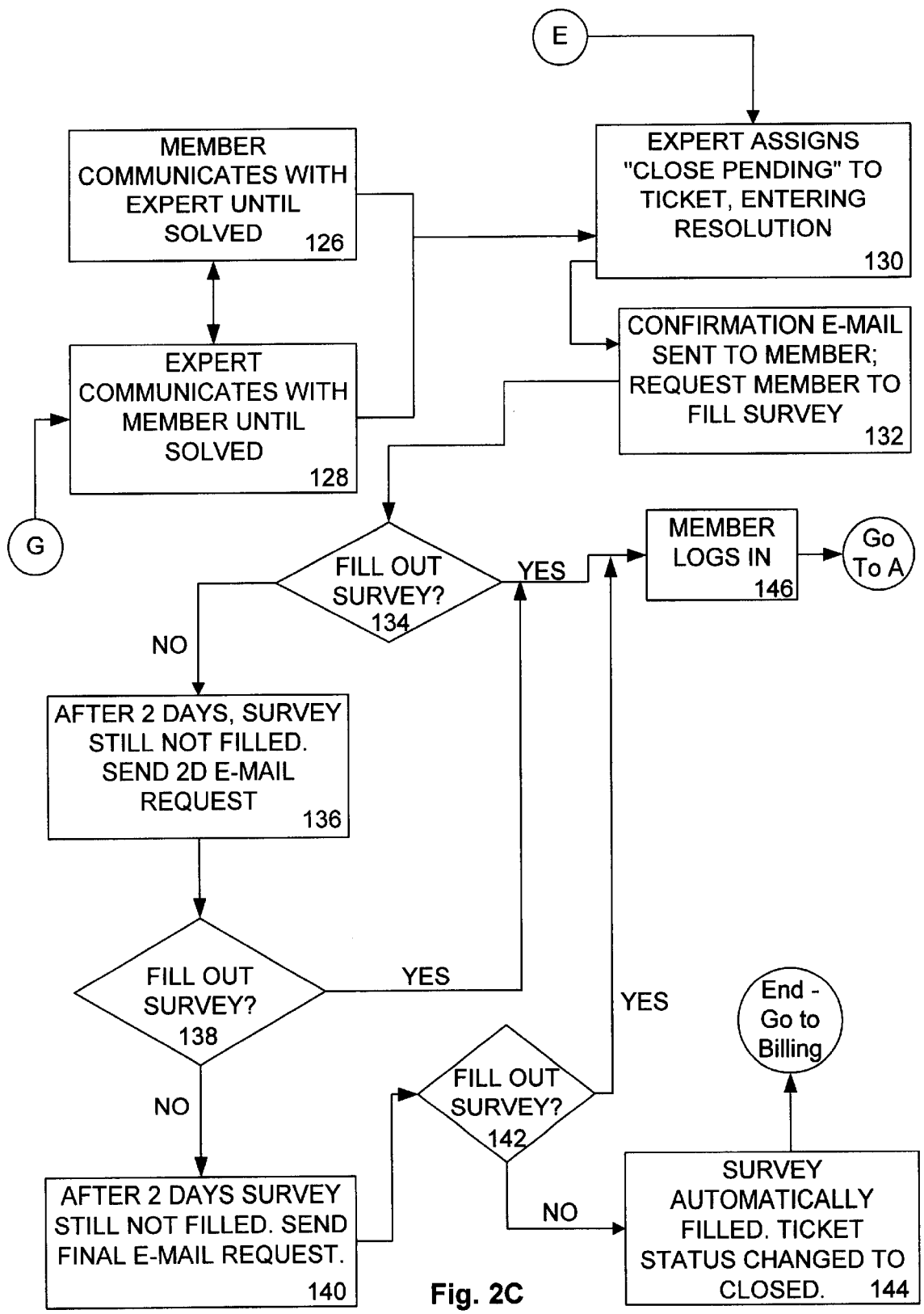

Referring now to FIG. 2 the overall assign up, assignment, and expert response flow of the present invention is illustrated. A customer accesses the system of the present invention 100 preferably over the Internet although this is not meant as a limitation. For example, a customer may also provide information via a telephone or other means of communication.

Confirmation of the sign-up is then sent to the customer member via electronic mail 102 providing a log in ID and password. Thereafter, either immediately upon receipt of the e-mail or on a subsequent occasion when services are needed the customer member logs into the system 104. At this point the customer member has a number of options.

If the customer member is signing on initially the customer member can create or change the customer membership profile 148. This profile provides information on the customer members organization, the type of equipment, and any other information relating to software and operating systems being run on the equipment and the network as appropriate.

The customer member also has the option of changing the customer member's password 150. If the customer member has already provided a request for assistance referred to as a "ticket" a customer member can view the ticket history 152. If the ticket relates to a particular problem that the customer member has asked to be solved, the customer member can view the specific ticket 154 to insure that the problem has been stated appropriately. Additionally the customer member is asked to fill out a survey 156 that relates to how well the problem was solved, was the problem solved in a timely way, was the interaction with the expert satisfactory and other factors that would give rise to quality assurance with respect to managing the experts who are affiliated with the system of the present invention. After the survey is completed it is submitted by the customer member 158 and the ticket is closed by the system. Thereafter billing for the services is accomplished 159.

Once the customer member has an account number and a password, the customer member can call in at any time whenever there is a problem requiring a consultant. In this instance, a customer member logs onto the system 104 and creates a ticket 106 which describes the difficulty being encountered in as much detail as possible. Once the screen detailing the problem has been completed the ticket is submitted 108 by the customer member. Confirmation email is sent to the customer member. The server of the present invention then takes the ticket that is submitted and e-mails it 110 to the appropriate expert group for response. In this instance the group may be a group of network experts, a group of experts in a particular software application, and the like. It should also be noted that communication with the expert groups is made by regular e-mail and wireless devices to the extent that the database has the appropriate communication information. This system then continually inquires to determine if any expert has responded to the ticket and indicated that he or she would respond. This is referred to as "booking" the ticket 112. If after a definable number of minutes the ticket is still not booked 114 the system sends e-mails to another group of experts who can appropriately respond to the question being posed.

If the ticket has been booked by an expert 112 the system determines how the ticket was booked 116. If the expert responded over the Internet the Internet procedures invoked 117 as will be more fully explained below.

If the expert responded via e-mail the experts e-mail response is received by the system 118 and the system assigns the ticket to the expert who responded 120.

Upon assigning the ticket to the expert 120 an e-mail or other notification is sent to the expert requesting that he initiate customer contact In addition, e-mail is sent to other experts in the group of expert to whom e-mail was sent informing them that the ticket was booked to another expert 124 although the identify of the expert to whom the ticket was booked is not necessarily disclosed.

As further noted below, communication and record keeping of the system involves assigning alias numbers to both the request for assistance and for the response by the expert in order to ensure that communication flows through the server of the present invention.

The expert then communicates with the customer member 128 and the customer member interacts with the expert 126 to solve the problem disclosed in the ticket.

When the ticket has been closed, that is, the problem has been solved by the expert, the expert so notifies the server of the present invention to close the ticket and enters information that describes how the problem was resolved 130. The server then sends an e-mail message to the customer member 132 noting that the expert has closed the ticket and has solved the problem. The e-mail also requests that the customer member fill out a survey to note the customer members satisfaction with the problem solution, the experts performance, and any other factor that affects the resolution of the ticket originally submitted by the customer member.

The survey is a critical aspect of the present invention and is done in an automated fashion to minimize the labor associated with the customer member's participation in the survey. Further, the survey serves as a basis for paying experts for work accomplished or not paying experts when the result has been unsatisfactory to the customer member.

After submission of the survey to the customer member, the system continually inquiries in its own records to determine if the survey report has been filled out 134. If the survey has not been filled out after two days, a second e-mail request for the completion of the survey is sent to the customer 136. The system then again keeps track internally to determine if the survey has been filled out 138. If the survey has not been filled out after, for example two days, a final e-mail request is sent to the customer member 140 to fill the survey out. The system then again internally monitors whether the survey has been completed 142. If the survey has not been completed the survey is automatically filled in with certain default values and the ticket status is changed to a "closed" status 144. Thereafter billing of the customer member ensues 145.

When the customer member is in the process of completing the survey the customer member logs in 146 and views the ticket history 152.

The customer member can then complete the survey as noted earlier 156 and submit that survey to the system 158. Thereafter billing ensues.

Figure 3:
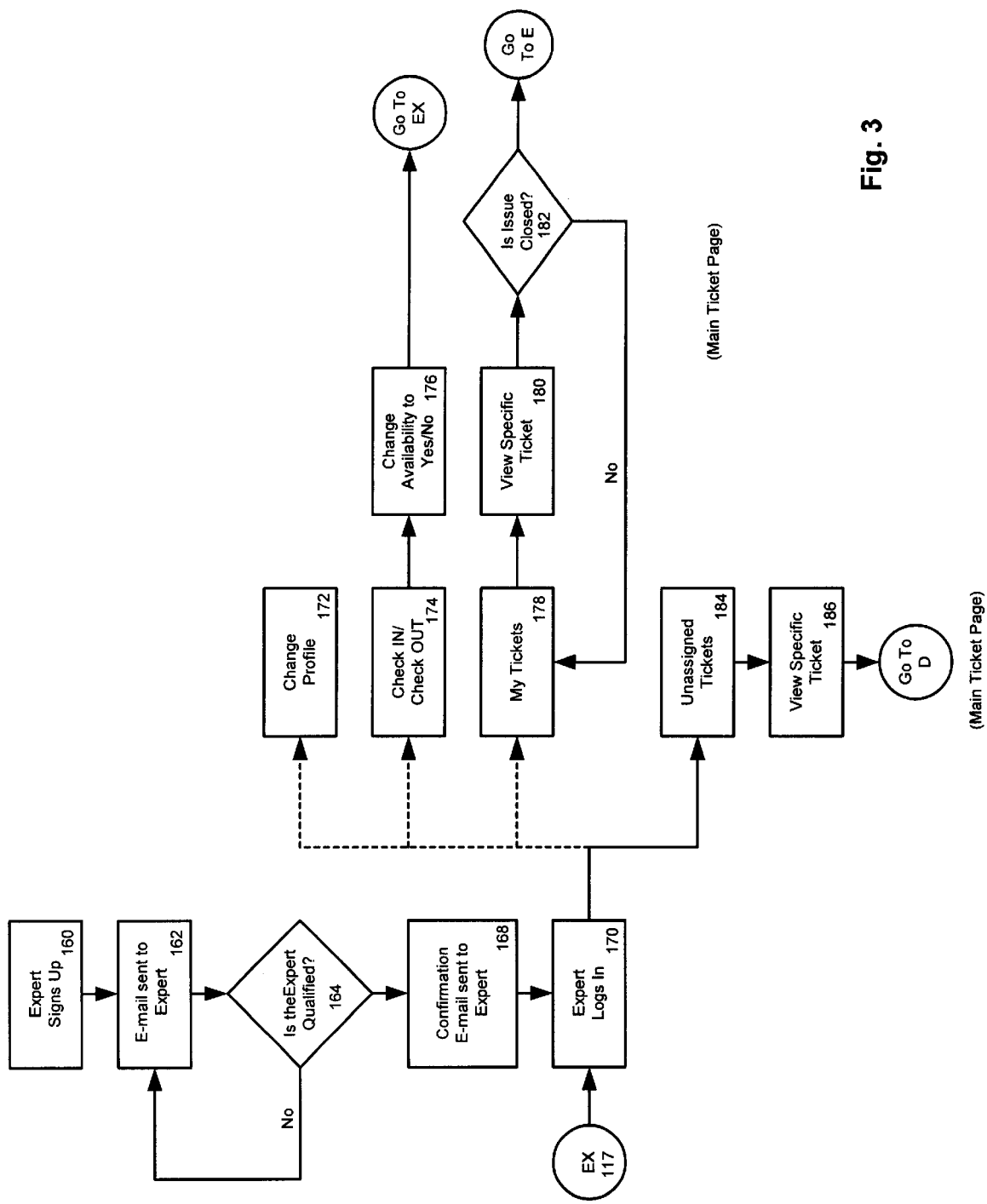
FIG. 3 illustrates the expert enrollment and interaction with the system of the present invention.

Referring now to FIG. 3 the expert enrollment and interaction with the system is illustrated. An expert initially logs onto the system of the present invention and signs up to become an expert 160 who can be called upon to satisfy various tickets. The system of the present invention then sends an e-mail to the expert 162 confirming his registration and informing him of the pending assessment of the expert qualifications, and that this will take place BEFORE the expert is assigned any tickets by the system. In this way the entity managing the server of the present invention ascertains the expert's qualifications and areas of expertise. If the expert is not qualified in any of the areas in which the system responds to customer members an e-mail is sent to the experts so notifying the expert. If the expert has the requisite qualifications a confirmation e-mail is sent to the expert 168 and the expert is then logged onto the system. The expert is assigned a password and customer identification number for which the expert can then log in 170.

At any point the expert can change or alter the expert's profile 172 thereby allowing the expert to more particularly respond to and be provided with information on tickets.

When the expert logs in 170 the expert can check in and out of the system 174 and change the expert's availability 176 so that the system knows when the expert will be available to receive requests for ticket response.

The expert can also note the experts own tickets 178 that have been responded to, assigned and are in progress. The expert can click on any ticket that is noted and view a specific ticket 180 and determine if the ticket has been closed 182. If the ticket is not closed, it continues to be listed on those open tickets assigned to the expert 178. If the ticket is closed as far as the expert is concerned, the expert assigns a "close pending" to the ticket as noted earlier in FIG. 2 130.

Once the expert logs in 170 the expert can also go to a file of unassigned tickets 184 and view any specific one ticket 186 and determine if the expert can respond to the ticket. If the expert can respond the expert will book the ticket as noted earlier in FIG. 2 120.

Figure 4:
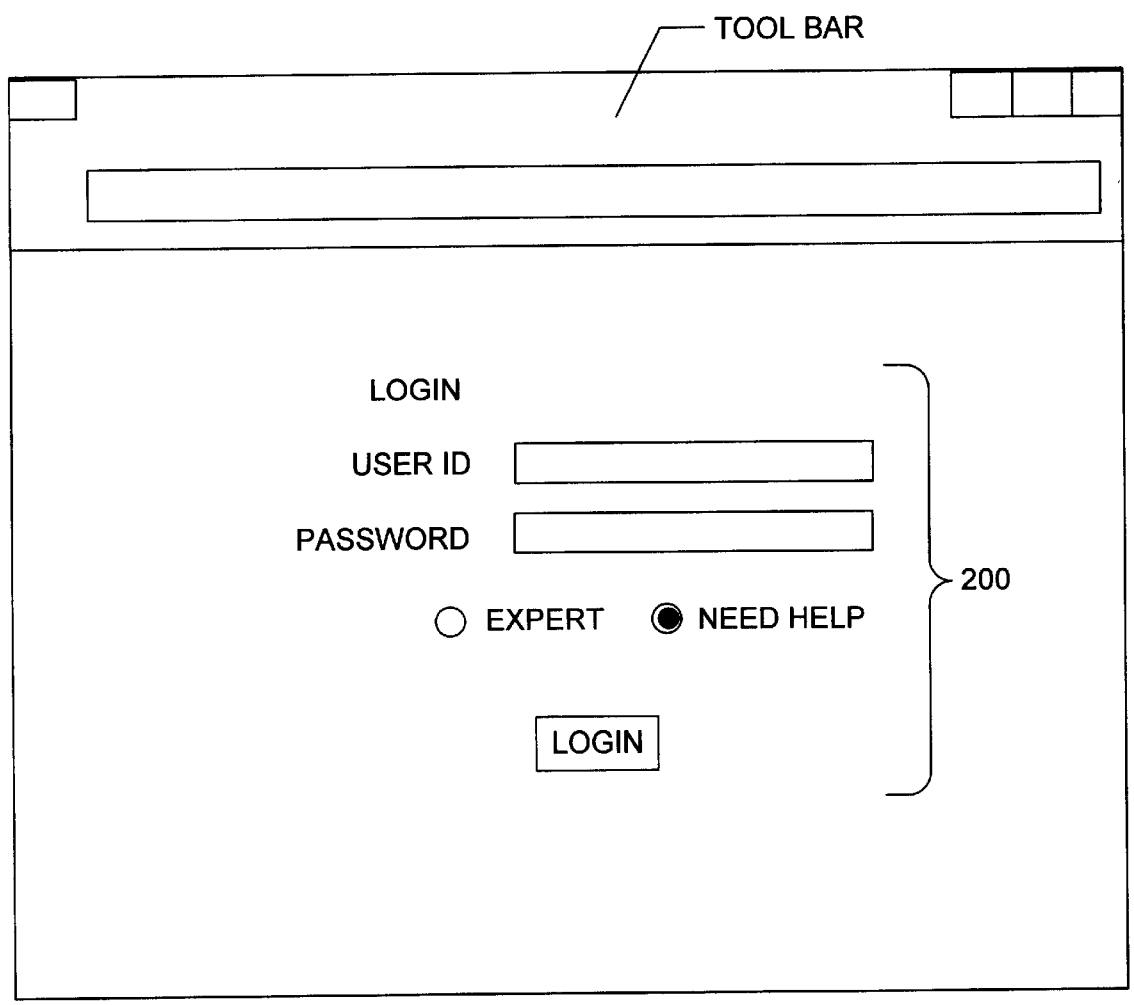
FIG. 4 illustrates login screen for the Expert Help Network.
Figure 5:
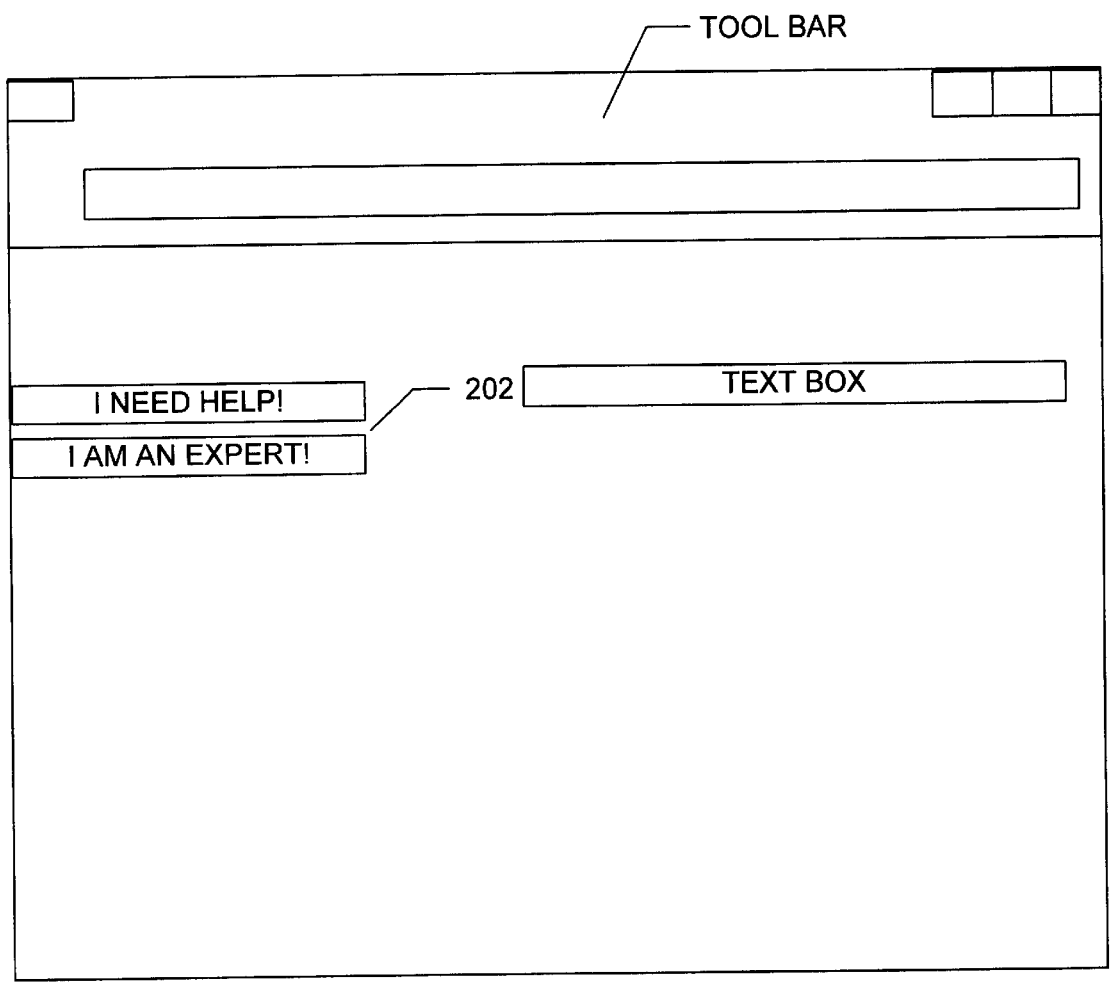
FIG. 5 illustrates a screen in which the customer selects whether he needs help or is an expert.

Upon entering the website, FIG. 4, the customer is presented with a login screen which asks also whether the customer is an expert or needs help 200. If the customer is not a customer member of the service, he is presented with a screen, FIG. 5, in which he must select whether he needs help or he is an expert 202.

Figure 7:
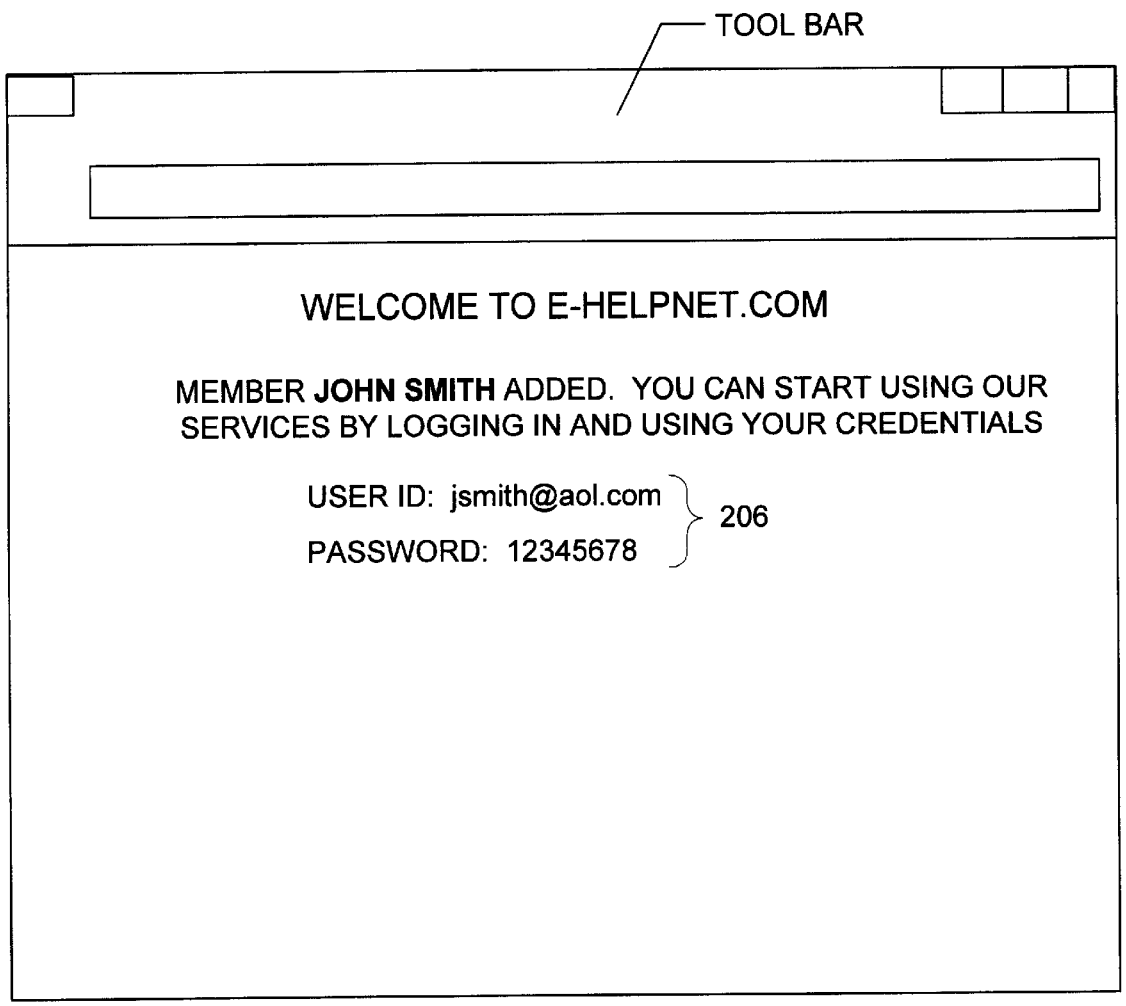
FIG. 7 illustrates the customer's customer ID and password for entering the Expert Help Network.

If the customer member selects the "I need help" option 202, the customer member is presented with a screen, FIG. 6, which consists of a data entry sheet requesting a plurality of answers pertaining to customer identification 204. Upon completion of the data entry sheet, FIG. 6, the customer member is presented with a screen, FIG. 7, which furnishes the customer member with his customer member ID and password 206.

Figure 8:
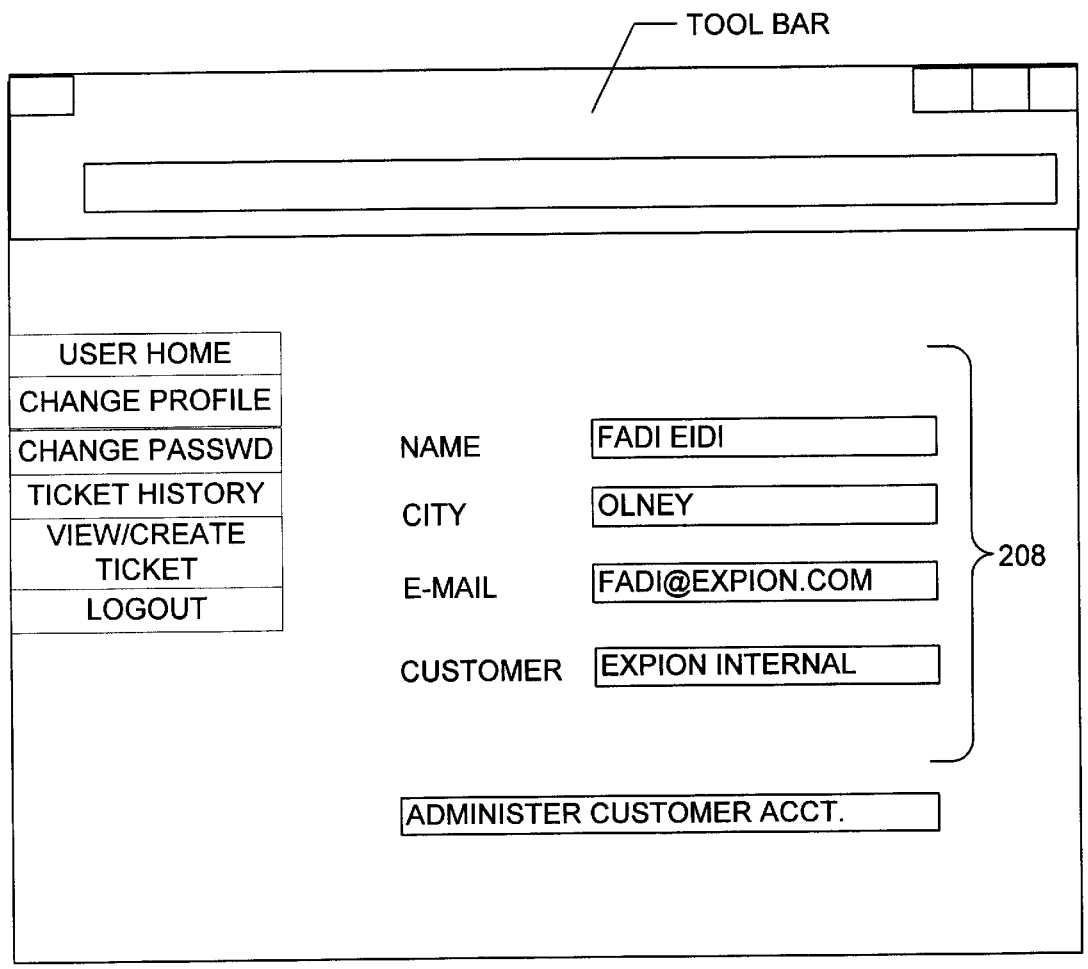
FIG. 8 illustrates a screen which confirms the customer's Name, city, and email address that is currently valid in the system.

In the Customer Home screen FIG. 8, which confirms the customer member's Name, City, and email address 208 that is currently valid in the system. Upon selecting "View/Create Ticket" the customer member is presented with a screen, FIG. 9, which asks whether this is a new ticket 210 and under what category this ticket is to be considered 212. Examples of categories are MS Exchange, Windows NT, etc. Additionally, the customer member is furnished with a text box in which he enters a description of his current problem 214. The customer member is also presented with a button which allow him to enter the ticket 216.

Figure 10:
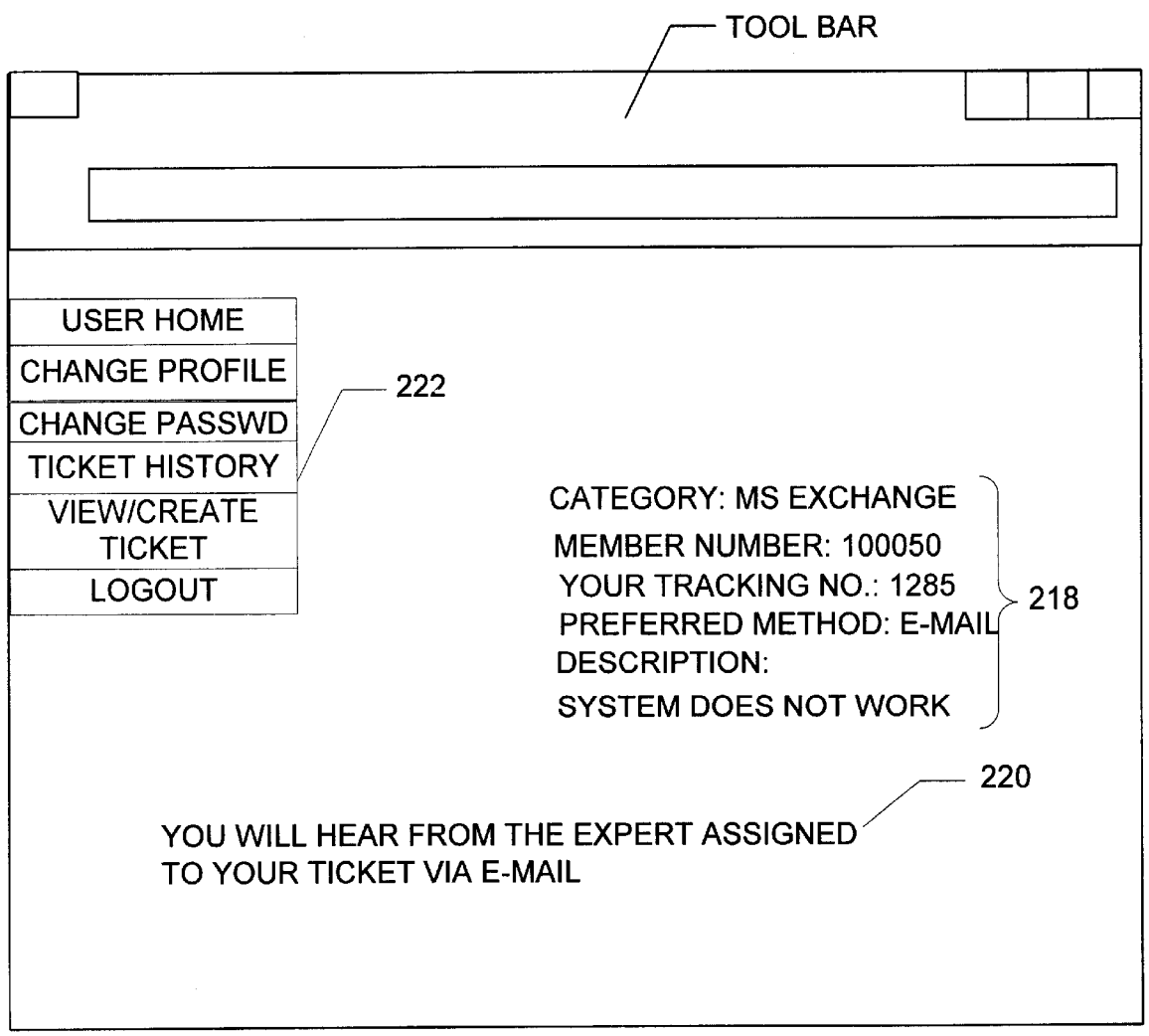
FIG. 10 illustrates a plurality of items of information regarding the customer's ticket.

Once the ticket is entered, the customer member is presented with a screen, FIG. 10, which furnishes a plurality of items of information regarding the customer member's ticket 218. The customer member is notified by the expert via email (although this is not meant as a limitation) when he has been assigned to the trouble call 220 by the server.

Figure 11:
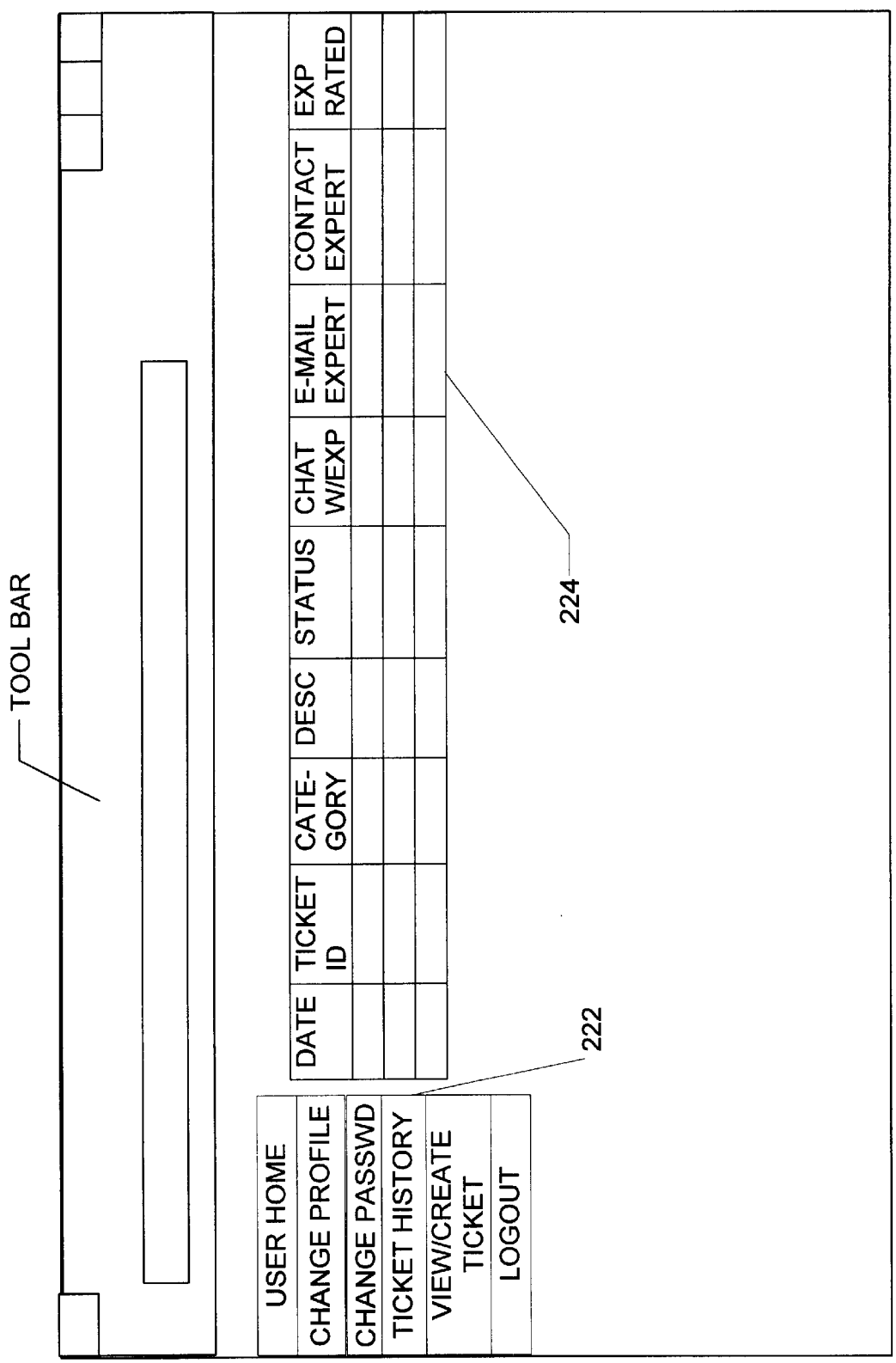
FIG. 11 illustrates a plurality of statuses regarding the customer's ticket(s).

If the customer member selects "Ticket History," 222 he is presented with a screen, FIG. 11, which furnishes a plurality of statuses regarding his ticket(s) 224.

Figure 12:
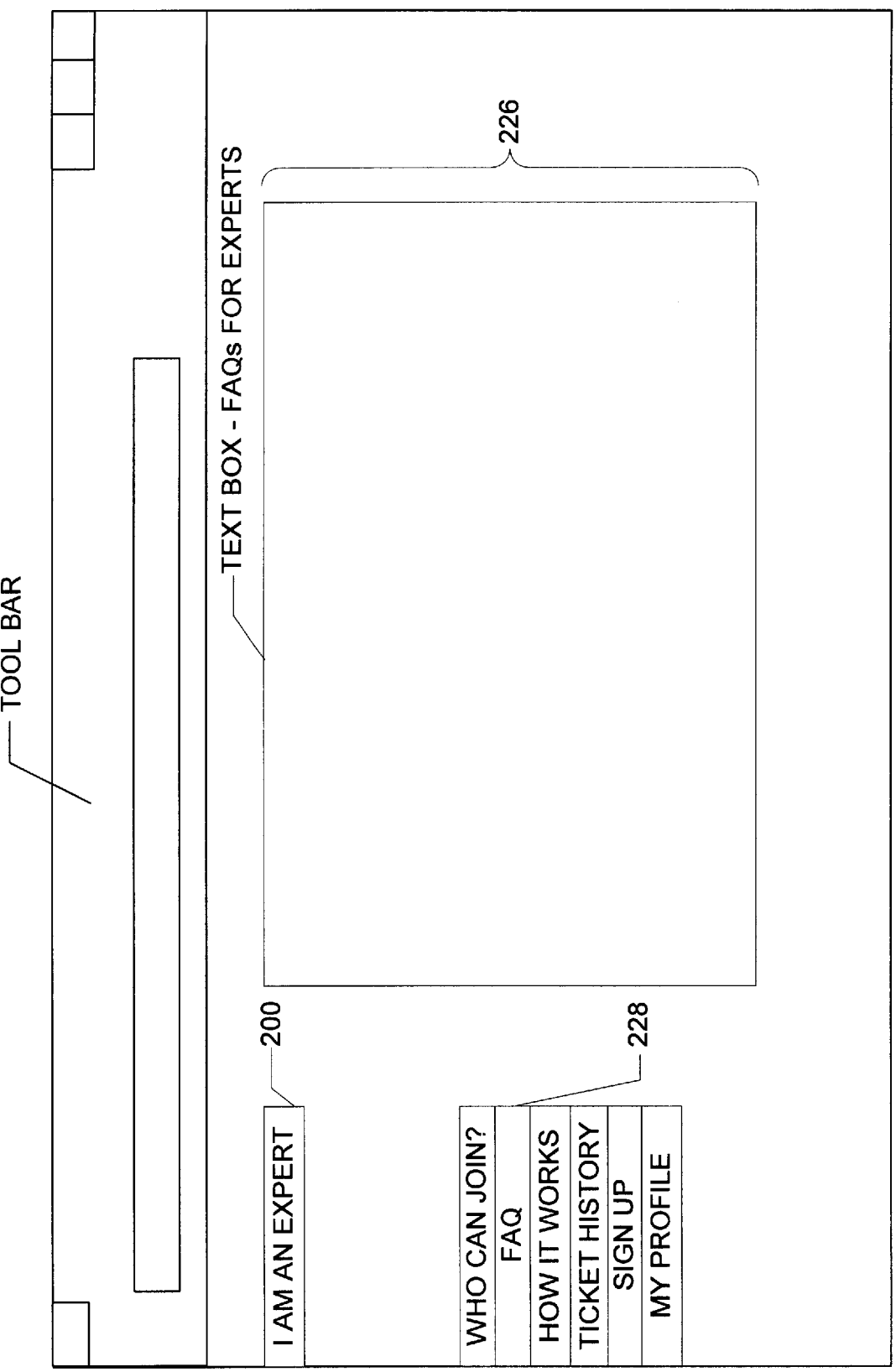
FIG. 12 illustrates a plurality of criteria for experts to join the Expert Help Network.
Figure 13:
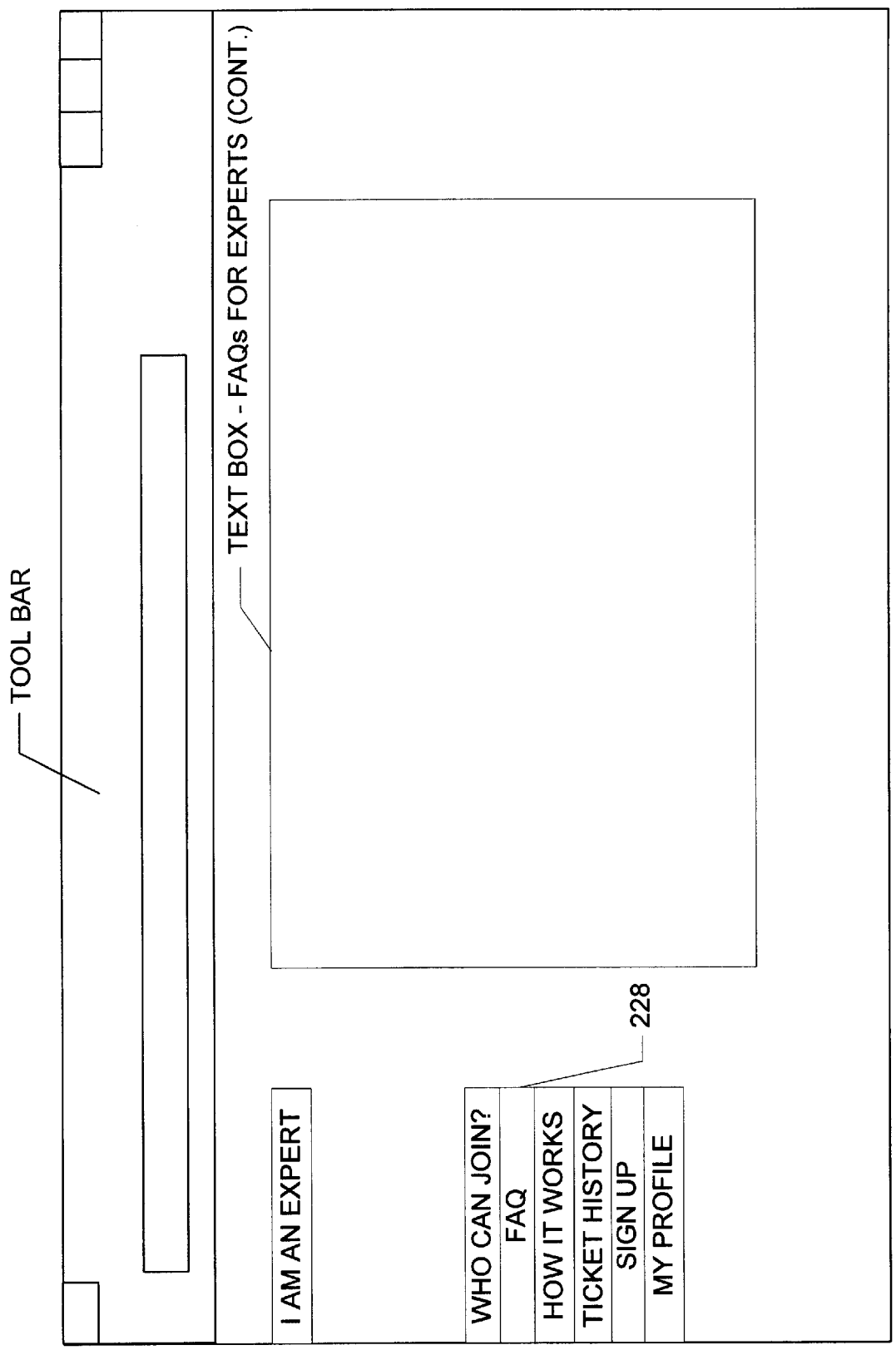
FIG. 13 illustrates a plurality of questions and answers pertaining to experts.

If the customer selects the "I am an expert" option 200, the customer is presented with a screen, FIG. 12, which gives some of the criteria for experts to join the Expert Help Network 226. If the customer selects the "FAQ" (frequently asked questions) button 228, he is presented with a screen, FIG. 13, which answers a number of question pertaining to experts and the Expert Help Network.

Figure 14:
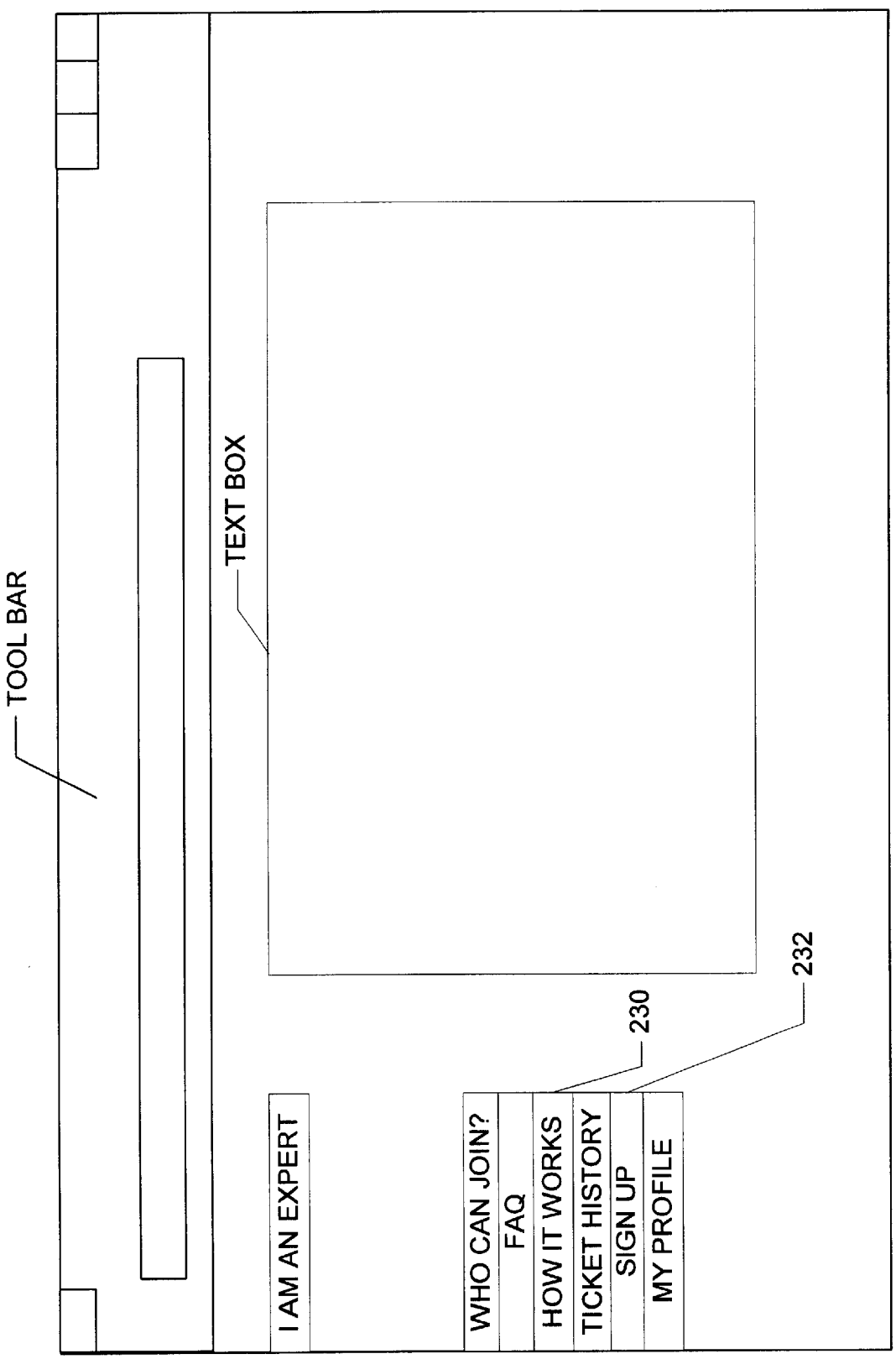
FIG. 14 illustrates a synopsis of how the network functions and the role of experts.

If the customer selects the "How it works" button 230, he is presented with a screen, FIG. 14, which gives a synopsis of how the Expert Help Network functions and the function of experts in the network.

Figure 17:
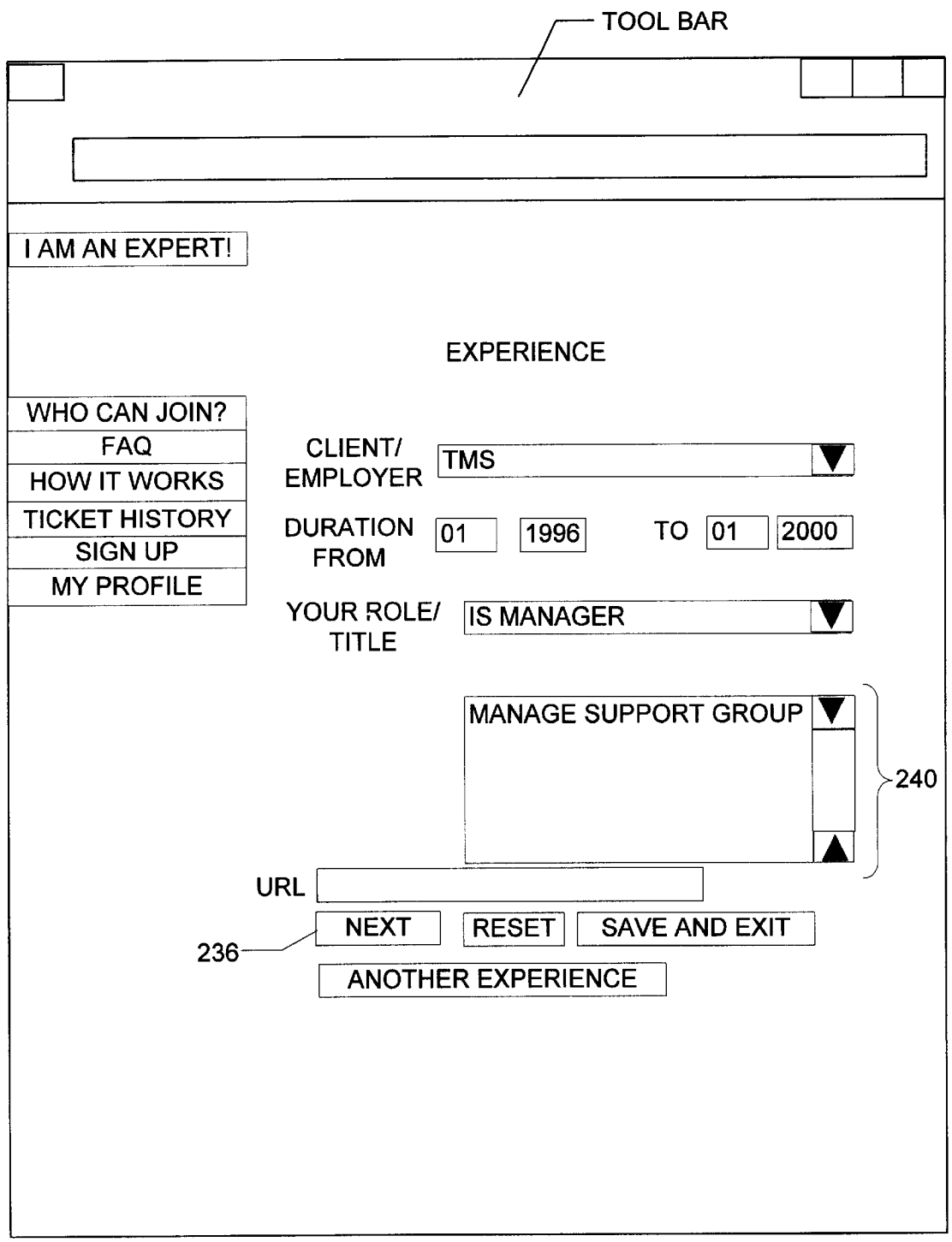
FIG. 17 illustrates a request for a plurality of items of information regarding experience as an expert.

If the customer selects the "Sign up" button 232, he is presented with a screen, FIG. 15, which furnishes a plurality of requests for items of information regarding contact information for the expert 234. Upon selecting the "Next" button 236, the customer is presented with a screen, FIG. 16, with a plurality of pull down menus regarding his skills 238. If the customer selects the "Next" button 236, he is presented with a screen, FIG. 17, which requests a plurality of items of information regarding his experience as an expert 240. If the customer selects the "Next" button 236, he is presented with a screen, FIG. 18, which requests a plurality of items of information regarding references as well as a text box for entering data pertinent to the reference 242.

Figure 19:
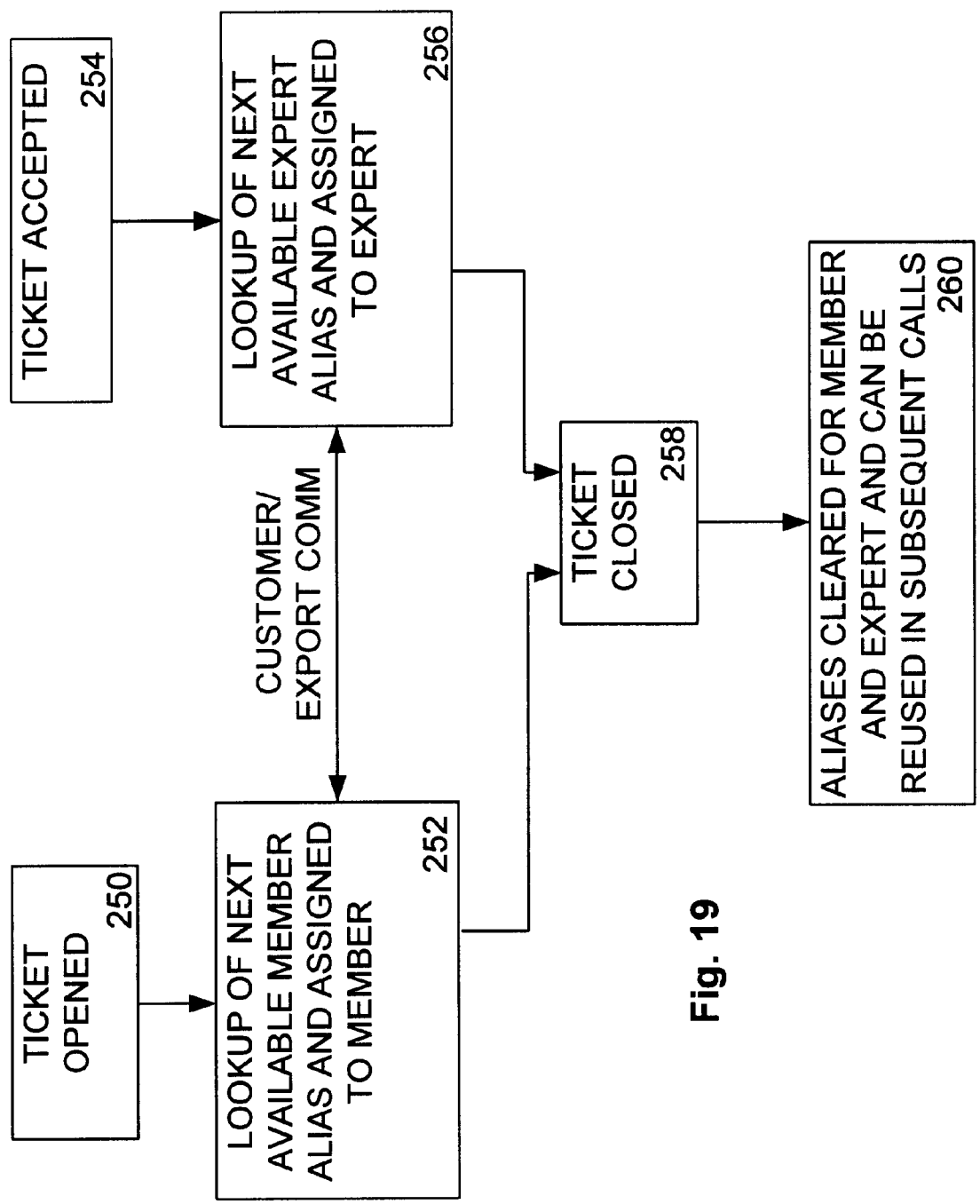
FIG. 19 illustrates the conceptual flow for assigning an alias to customer problems and experts assignments.

Referring to FIG. 19, the present invention performs an "aliasing" function to both ensure that communication between the ultimate client and the expert occurs through the server of the present invention.

When a ticket is open 250, the server creates an alias 252 for the ticket that is open. This alias is assigned to not only the ticket, but is associated with the person or entity that is having the particular problem. In this fashion, the server can always determine who the point of contact is at the customer entity for billing and survey purposes.

The ticket number with the associated alias is then made available to experts to respond to. When an expert accepts the particular troubled ticket 254, the expert is assigned an alias 256 which is associated with the ticket alias created 252. This expert alias 256 varies from ticket to ticket so that a particular expert who accepts five different tickets may in fact have five different aliases associated with the different tickets. All communication with respect to the problem occurs via the server which then associates the various ticket and expert aliases and ensures that communication reaches the ultimate customer from the expert.

When the ticket is closed 258, the various aliases are cleared 260 and these aliases are subsequently made available for further tickets and aliases. Thus, the unique alias for the ticket and for the expert accepting the ticket occur only so long as the ticket is opened. Once the ticket is closed, the alias numbers are made available again for re-use.

The system and method of the present invention can also be used in a general way to dispatch experts in a variety of other service areas. For example, people may have difficulty with electrical systems, plumbing, stereo systems, and a wide variety of other household tasks where the customer member can simply benefit from someone "talking" them through the problem. Thus the application of this expert reference system of the present invention is not meant as a limitation but is illustrative of the concept of having a wide variety of unaffiliated experts who can respond via an expert reference server to the problems of customer members in a variety of categories.

As a further example, and without limitation, many businesses have human resources (HR) issues that require expert assistance but cannot afford to have an HR person present on staff. The systems and method of the present invention will allow HR experts to be on call to respond to questions in precisely the same manner as in the information technology example noted above. Other such examples of the use of the present invention are for legal service, technical experts within a large company being referred to others within the same company, getting the most qualified plumbing expert for the job and other similar choices where expertise is required.

It will therefore be apparent to those skilled in the art that other variations of the present invention in contacting experts via wired and wireless networks and in contacting customer members by the experts using both wired and wireless means can be achieved without departing from the scope of the invention as disclosed.

I claim:

1. A system for obtaining expert referral comprising:
   a server further comprising a file of experts having qualifications;
   a network connected to the server for allowing access to the file of experts;
   at least one user computer connected to the network for submitting a request for assistance ticket from a user, said request for assistance ticket requiring an expert having specific qualifications;
   the server further comprising assignment instructions adapted to assign the request for assistance ticket to at least one expert for response and adapted to receive a response from the at least one expert to the assignment;
   the server further comprising real time communication instructions adapted to facilitate real time communication between the expert and the user regarding the request for assistance ticket;
   the server further comprising instructions adapted to create a quality ranking for each expert based on user satisfaction questionnaire data;
   wherein said assignment instructions are adapted to contact successive groups of experts having qualifications matching said specific qualifications on a priority basis of highest quality rankings until at least one expert sends a response; and
   wherein said quality ranking for each expert based on user satisfaction questionnaire data is continuously updated upon collection of additional user satisfaction questionnaire data related to the communication between the expert and the user regarding the request for assistance ticket.

2. The system for obtaining expert referral of claim 1 wherein the server further comprises instructions adapted to register and qualify experts to be resident on the file of experts.

3. The system for obtaining expert referral of claim 2 wherein the assignment instructions further comprise contact information for contacting the plurality of experts.

4. The system for obtaining expert referral of claim 2 wherein the instructions adapted to register and qualify experts are further adapted to record availability of experts to respond to requests for assistance and the areas of expertise of the expert.

5. The system for obtaining expert referral of claim 4, wherein said file of experts includes the availability of experts and the assignment instructions adapted to assign only assign experts having present availability.

6. The system for obtaining expert referral of claim 1 wherein the server further comprises instructions adapted to send a satisfaction questionnaire to the user to collect said user satisfaction questionnaire data used to create said quality ranking upon completion of the request for assistance ticket by the expert to whom the request for assistance ticket was assigned.

7. The system for obtaining expert referral of claim 6 wherein the server further comprises instructions adapted to pay the expert based upon the satisfaction questionnaire data from the user.

8. The system for obtaining expert referral of claim 1 wherein the server further comprises instructions adapted to assign an alias to the request for assistance from a user and adapted to assign an alias to the expert who responds to the request for assistance.

9. The system for obtaining expert referral of claim 8 wherein communication instructions adapted to facilitate the communication between the expert and the user are provided by the server and wherein the server comprises a file of assigned aliases for routing messages between the expert assigned to the request for assistance and the user making the request for assistance.

10. The system for obtaining expert referral of claim 1 wherein the server further comprises instructions adapted to allow a user or an expert to view a status of tickets.

11. The system for obtaining expert referral of claim 1 wherein the real time communication instructions further comprise instruction for establishing on-line chat between the expert and the user.

12. The system for obtaining expert referral of claim 1 wherein the real time communication instructions further comprise instruction for establishing internet telephony between the expert and the user.

13. The system for obtaining expert referral of claim 1 wherein the real time communication instructions further comprise instruction for establishing video teleconferencing between the expert and the user.

14. A method for expert referral comprising:
   a user requesting assistance of an expert having specific qualifications over a first network;
   a server receiving the request for assistance and creating a ticket associated with the request;
   the server selecting a plurality of qualified experts from a file of experts having appropriate qualifications, wherein each expert has a quality ranking determined by user satisfaction questionnaire data;
   the server communicating the ticket to successive groups of said plurality of qualified experts over a second network on a priority basis of highest quality ranking until at least one expert responds to the ticket;
   the server facilitating real time communication between the expert and the user to solve the ticket; and
   the server continuously updating said quality ranking for each expert determined by user satisfaction questionnaire data upon collection of additional user satisfaction questionnaire data related to the real time communication between the expert and the user to solve the ticket.

15. The method for expert referral of claim 14 wherein the plurality of experts is created by registering experts and verifying their qualifications before communicating the ticket to any one expert.

16. The method for expert referral according to claim 14 wherein the first network is the internet and the second network is the internet.

17. The method for expert referral according to claim 14 wherein the first network is the internet and the second network is a PSTN.

18. The method for expert referral according to claim 14 wherein the first network is the Internet and the second network is a wireless network.

19. The method for expert referral according to claim 14 wherein the facilitating of communication comprises the server assigning an alias to the user and an alias to the expert; and passing communication between the expert and the user through the server by associating the user alias and the expert alias.

20. The method for expert referral according to claim 19 further comprising the server clearing the aliases upon completion of the ticket.

21. The method for expert referral according to claim 14 further comprising:

the expert closing the ticket with the server upon completion of the ticket by the expert; and the server submitting a satisfaction questionnaire to the user upon the completion of the ticket by the expert to collect said user satisfaction questionnaire data used to determine quality ranking of said experts.

22. The method for expert referral according to claim 21 further comprising paying the experts based upon the satisfaction questionnaire data.

23. The method for expert referral according to claim 21 comprising assigning subsequent tickets to the expert based upon the expert ranking.

24. The method for expert referral according to claim 14 wherein the server facilitating communication between the expert and the user comprises the server establishing communication via video teleconferencing.

25. The method for expert referral according to claim 14 wherein the server facilitating communication between the expert and the user comprises the server establishing communication via internet telephony.

26. The method for expert referral according to claim 14 wherein the server facilitating communication between the expert and the user comprises the server establishing communication via online chat session.

* * * * *